United States Patent [19]

Jobst et al.

[11] Patent Number: 4,862,969

[45] Date of Patent: Sep. 5, 1989

[54] METHOD AND APPARATUS FOR CULTIVATING PLANTABLE SOILS MORE PARTICULARLY FOREST SOILS

[75] Inventors: Georg Jobst; Egon Jobst, both of Steinau-Ulmbach, Fed. Rep. of Germany

[73] Assignee: G & E Jobst GmbH, Steinau-Ulmbach, Fed. Rep. of Germany

[21] Appl. No.: 48,230

[22] Filed: May 11, 1987

[30] Foreign Application Priority Data

May 13, 1986 [DE] Fed. Rep. of Germany ....... 3616072

[51] Int. Cl.$^4$ .................... A01B 33/00; A01D 50/00; A01G 23/06; B02C 19/12
[52] U.S. Cl. ..................... 172/45; 56/12.7; 56/15.2; 172/99; 172/108
[58] Field of Search ............. 172/45, 39, 108, 96, 172/99; 56/12.7, 15.2, 16.2, 29

[56] References Cited

U.S. PATENT DOCUMENTS

| | | | |
|---|---|---|---|
| 1,862,035 | 6/1932 | Rainwater | 172/45 |
| 2,531,732 | 11/1950 | Hoffman | 172/45 |
| 2,597,485 | 5/1952 | Hillyer | 172/45 X |
| 2,691,262 | 10/1954 | Swertfeger | 172/45 |
| 2,781,624 | 2/1957 | Mountz | 172/45 |
| 3,020,694 | 2/1962 | Foshee | 172/45 X |
| 3,754,603 | 8/1973 | Bogel | 172/45 |
| 4,328,660 | 5/1982 | Simmons | 56/12.7 |
| 4,698,925 | 10/1987 | Jones | 172/40 |

FOREIGN PATENT DOCUMENTS 1264524  5/1961  France ................... 172/45

Primary Examiner—Richard J. Johnson
Attorney, Agent, or Firm—Felfe & Lynch

[57] ABSTRACT

A method for cultivating plantable soils, more particularly forest soils, by breaking-up and working-in plants and parts of plants lying upon the soil, for example leaves, needles, twigs and branches. To this end, a plurality of elements, flexible in all directions, tautened by centrifugal force, and secured to a shaft, are caused to rotate by the said shaft, the radius of rotation of the ends of the said elements being greater than the selected distance between the axis of rotation of the shaft and the surface of the ground. In order to be able to mechanically cultivate larger areas of substantially uneven and non-homogeneous forest soils, the horizontal axis of rotation of the shaft is also subjected to an oscillating pivoting motion about a vertical axis, the axis of rotation of the shaft being kept substantially radial to the pivot-axis and being moved in a circle which is parallel to the surface of the ground. Arranged upon the vehicle is a superstructure which is adapted to rotate in relation to the said chassis and upon which the shaft is mounted substantially radially to the pivot-axis. The superstructure and the shaft are motor-driven.

24 Claims, 4 Drawing Sheets

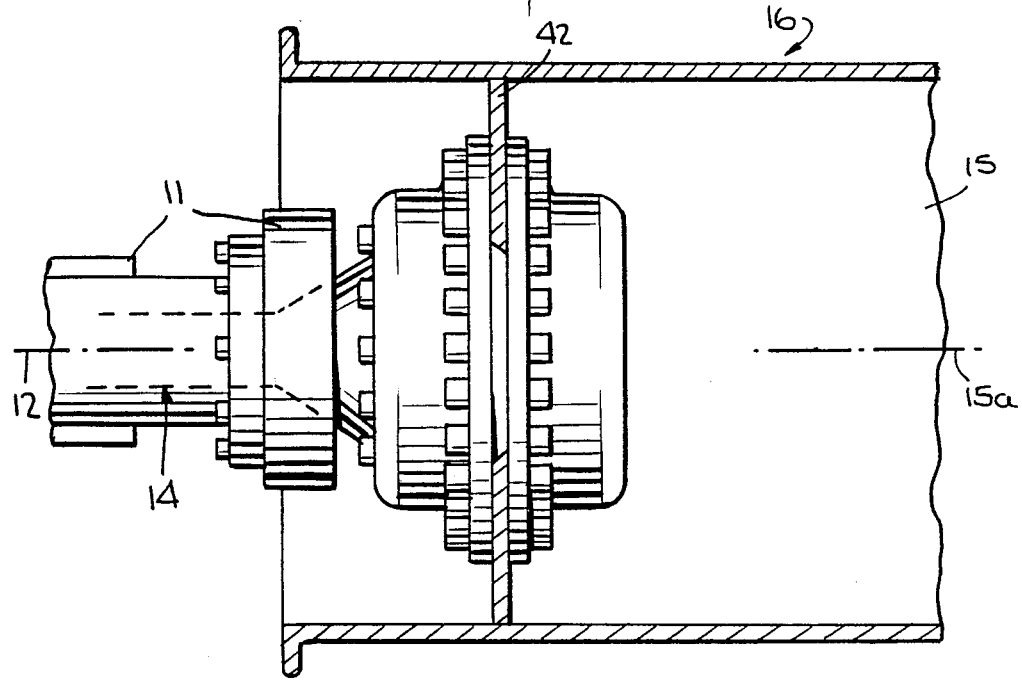
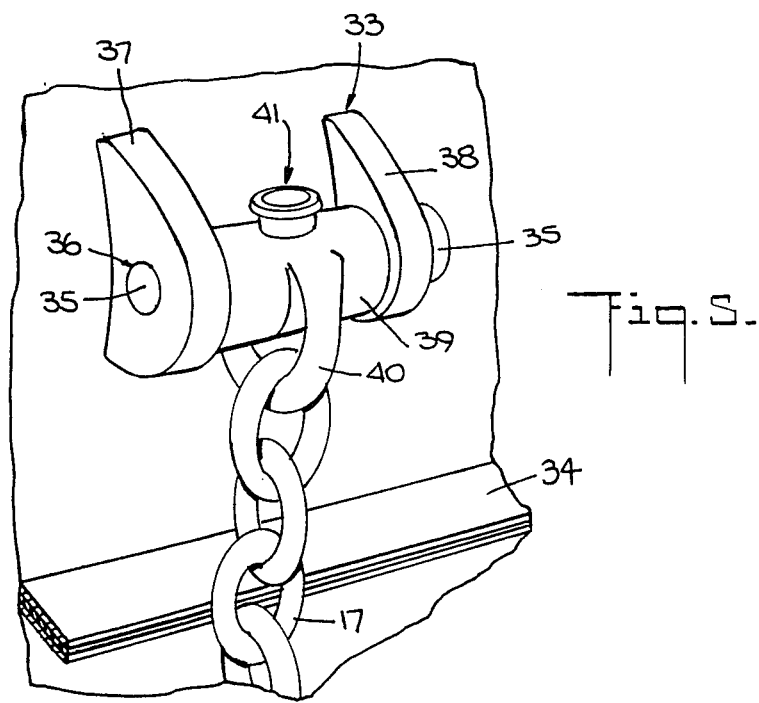

METHOD AND APPARATUS FOR CULTIVATING PLANTABLE SOILS MORE PARTICULARLY FOREST SOILS

The invention relates to a method for cultivating plantable soils (13), more particularly forest soils, by breaking-up and working-in plants and parts of plants lying upon the soil, for example leaves, needles, twigs and branches, to which end a plurality of elements (17), flexible in all directions, tautened by centrifugal force, secured to a substantially horizontal shaft (14) and distributed longitudinally of the axis of rotation thereof, are caused to rotate by said shaft. The radius of rotation of the ends of the said flexible elements being greater than the selected distance between the axis of rotation of the shaft and the surface of the ground.

The "elements flexible in all directions," preferably link chains of finite length, strike the ground like whips, whereby brittle plants and parts of plants are broken up to a much greater extent than they are slung sideways (in which case they are not broken up). The flexible elements slide over practically insuperable obstacles such as tree stumps, heavy roots and large boulders without being subjected to heavy wear as a result of unavoidable friction.

Pertaining to the prior art (DE-A-3216951) is an appliance known as a "mulch hoe", which is driven by a rubber-tired vehicle and in which plate-like centrifugal weights are mounted in a roll upon axially parallel trunnions. When an obstacle such as the root of a tree or a rock is struck, the said weights pivot inwardly into the roll, thus preventing the plates from being broken. However, such appliances can operate only at a small depth. The plate-like centrifugal weights act substantially tangentially upon the ground, so that material lying thereupon is slung mainly sideways instead of being broken up and worked into the soil. The roll with the centrifugal weights (= flails) is therefore followed by a shaft carrying rigid chopping blades located at a greater depth. Appliances of this kind are not suitable for uneven forest ground, especially ground with projecting tree stumps. Another major disadvantage is that when the centrifugal weights impinge obliquely upon an obstacle, axial force components are produced and the centrifugal weights are slowed down or even become jammed and must be subjected to complex repairs.

US-A-2 531 732 discloses an apparatus for breaking up harvest residues lying in fields. In this case the centrifugal weights are in the form of chains at the end of which impact tools are arranged. Here again, this apparatus is totally unsuitable for use in forests.

A feature common to the two pieces of equipment described hereinbefore is that the axes of rotation thereof run parallel with the axes of the traction and driving vehicle and that they are towed in the track of the said vehicle. If a large area is to be cultivated, it must be such that the apparatus can be driven thereover in several parallel paths. The disadvantage of this is that the soil to be loosened in compacted by the tires of the tractor running back and forth along closely adjoining paths.

The ground in a forest usually exhibits major irregularities both below and above the surface. The main obstacles to machines are tree stumps and the roots emanating therefrom. If trees have been brought down by wind, the stumps remaining after removal of the trunks are of various heights, since the saws used to clear the area could not be operated any lower down. In the case of windfall trees, if the surface of the root is at an angle to the horizontal, the roots projecting from the ground, some of which are quite heavy, also prevent the use of machines. Sawing off or breaking up such roots or trunk remains leads to further problems in that the soil adhering thereto leads to rapid wear of the saws. The branches and foliage remaining after removal of the tree trunks also interfere with the use of machines.

Since modern forestry does not allow areas to lie for years without stands of trees until the stumps rot and replanting is carried out, the cultivation of forest soil has hitherto usually been done by manual labor, requiring several forestry workers per unit of area. A substantial part of this work is the so-called "mulching", i.e. for the purpose of adjusting the soil moisture for the subsequent planting of young trees, the layer of plants and parts of plants typical of forest soils must be mixed with a thin layer of the underlying soil and must be converted into a loose covering. If this is to be done by hand, it is first necessary to remove the twigs and branches, usually accomplished by assembling them all at a given location and burning them. This is not only highly labor-intensive but also causes considerable environmental pollution. Moreover, the burning destroys valuable fertilizers and kills off vital micro-organisms.

It is therefore the purpose of the invention to provide a method of the type described at the beginning hereof whereby large areas of highly uneven and non-homogenous forest ground can be cultivated mechanically and with a minimal use of human labor.

In the case of the method described at the beginning hereof, this purpose is accomplished in that the horizontal axis of rotation of the shaft is also adapted to pivot back and forth about a vertical pivot axis, and the axis of rotation of shaft 2 is caused to move over a circular area running parallel with the surface of the ground.

The cultivated surface is thus in the form of an area wiped by a windscreen wiper and there is no need for major lateral displacement of the vehicle used to transport and drive the shaft.

It is, however, particularly advantageous for the pivot-axis to be displaced, during the cultivating process, either continuously or stepwise. The result of this is that several sections of the previously mentioned circular area are arranged in a row in the direction of travel of the vehicle, while the lateral boundaries, running parallel with the said direction of travel, of the entire cultivated area are spaced apart at a distance equal to several times the width of the track of the vehicle. This means that a relatively large cultivated area carries only one track and there is therefore no unacceptable compacting of the cultivated area.

With the method according to the invention, therefore, large plants and parts of plants, also including brush, are broken up, and are swirled around with the relatively loose soil cover and a certain amount of surface-soil. This largely homogenized mixture is then deposited upon the new surface obtained, in the form of a loose "mulch". During replanting, all that is required is to make holes which are deeper, by a certain amount, than the thickness of the layer of mulch. After the young trees have been put in place and the holes have been filled up again, soil moisture is regulated by the layer of mulch and is moreover maintained, and valuable humus and fertilizer is prepared.

If the flexible elements strike tree stumps etc. there is little cause for concern. In the case of oblique root surfaces, it is even possible to use the flexible elements to sling out soil located between the roots and thus to prepare them for sawing off.

Taking into consideration the dimensions of the shaft and of the flexible elements explained in greater detail hereinafter, the rotational speed of the shaft should be about 500 to 1000 r.p.m.$^{-1}$. The power required for this has been found to between about 150 and 250 kW.

The invention also relates to an apparatus for the implementation of the method according to the invention. As in the case of the prior art, this consist, first of all, of a vehicle adapted to travel over the ground and carrying a shaft, driven by a motor and running substantially parallel with the surface of the ground, to which are secured several elements flexible in all directions and distributed longitudinally and peripherally of the axis of rotation of the shaft, in such a manner that, at the operating rotational speed, but in an otherwise unloaded condition, their longitudinal axes are caused to extend substantially radially by centrifugal force.

In order to accomplish substantially the same purpose, the apparatus according to the invention is characterized in that the vehicle comprises a superstructure which is adapted to rotate about a vertical pivot axis in relation to the chassis and upon which the shaft is mounted substantially radially of the said pivot axis; and in that the said superstructure may be pivoted, by means of a drive, in such a manner that the axis of rotation of the shaft moves back and forth in a circle which runs parallel with the surface of the ground.

It is also desirable for a boom to be located between the pivotable superstructure and the shaft, the said boom being located in a vertical plane radially of the said pivot axis, and a bearing for the said shaft being arranged at the end of the boom remote from the superstructure.

If the boom is pointing in the direction of travel, the shaft also runs in the direction of travel. This is in marked contrast to the apparatuses described at the beginning hereof, in which the axis of rotation of the mulch hoe and the roll is at right angles to the said direction of travel. Pivoting the boom and the shaft back and forth makes it possible to cultivate the previously mentioned circular area (or a segmental area thereof). Arranging such sectors in a row in the direction of travel makes it possible to cultivate an area which, with a boom of suitable length, is several times wider than the track of the endless-track vehicle It is also desirable for the boom to be pivotable in a vertical plane for the purpose of adjusting the distance between the shaft and the ground. It is also desirable—but not absolutely necessary—for the angle between the shaft and the boom to be adjustable. The longer the boom the greater the adjustment of the distance between the shaft and the ground, without the shaft assuming an unacceptable angle in relation to the surface of the ground.

By lowering the boom and bringing the axis of the drum closer to the surface of the ground, it is possible to increase the amount of soil mixed with the mulch.

In this connection, it is particularly advantageous for the shaft to be in the form of a cylindrical drum, to the surface of which the elements, flexible in all directions, are secured by means of hinges adapted to move peripherally.

This makes it possible for the flexible elements, upon striking an obstacle, to adapt themselves almost to the shape of the drum and there is thus no danger of them being torn off or bent.

These hinges preferably have hinge pins which run parallel with the axis of rotation or the axis of the drum. They extend between brackets secured to the surface of the drum and carry sleeves to which are secured elements for the attachment of the flexible elements.

A definite bearing structure is thus provided at the most highly stressed locations and it has been found that this extends the life of the apparatus, before repairs to the flexible elements are needed, by about 5 to 10 times, especially if the said hinges are provided with grease fittings.

It has also been found particularly advantageous for the distance between the hinge axes, in the peripheral direction of the drum, to be between 0.5 and 1.5 times the length of the flexible elements. At one times the length, the end of the flexible element, which lies in the form of an arc upon the drum, could just reach the following hinge axis. However, a certain amount of overlap in the length has been found extremely useful for the whip effect, without producing any unwanted wear in the flexible elements.

It has also been found particularly advantageous in practice for the weight of the flexible elements per running meter to be between 5 and 15 kg, preferably between 8 and 12 kg.

According to one practical example of embodiment, twelve link chains were secured to a drum having a diameter of 60 cm and a length of 1.2 m, in six radial planes, the chains being arranged in diametrical paris and staggered through 90 in the peripheral direction. The length of one chain was about 1 m and the weight 9.5 kg per running meter. With a driving power of 185 kW, the average rotational speed obtained was 700 r.p.m. $^{-1}$, and this provided faultless cultivation of an area which was particularly difficult because of the undulating surface.

It is also advantageous for the vehicle to have endless tracks since this makes it possible to use a heavy vehicle with low pressure per unit of area. This ensures the necessary reliable guidance of the shaft with its flexible elements.

Further advantageous configurations of the invention may be gathered from the remaining sub-claims.

An example of embodiment of the object of the invention is explained hereinafter in greater detail in conjunction with the drawing attached hereto, wherein:

FIG. 4 is a partial axial section through the drum in the vicinity of its connection with the drive shaft.

FIG. 5 is an enlarged detail from FIG. 3 showing the hinge between the drum and one of the flexible elements.

DETAILED DESCRIPTION OF THE EMBODIMENT

Figure 1:
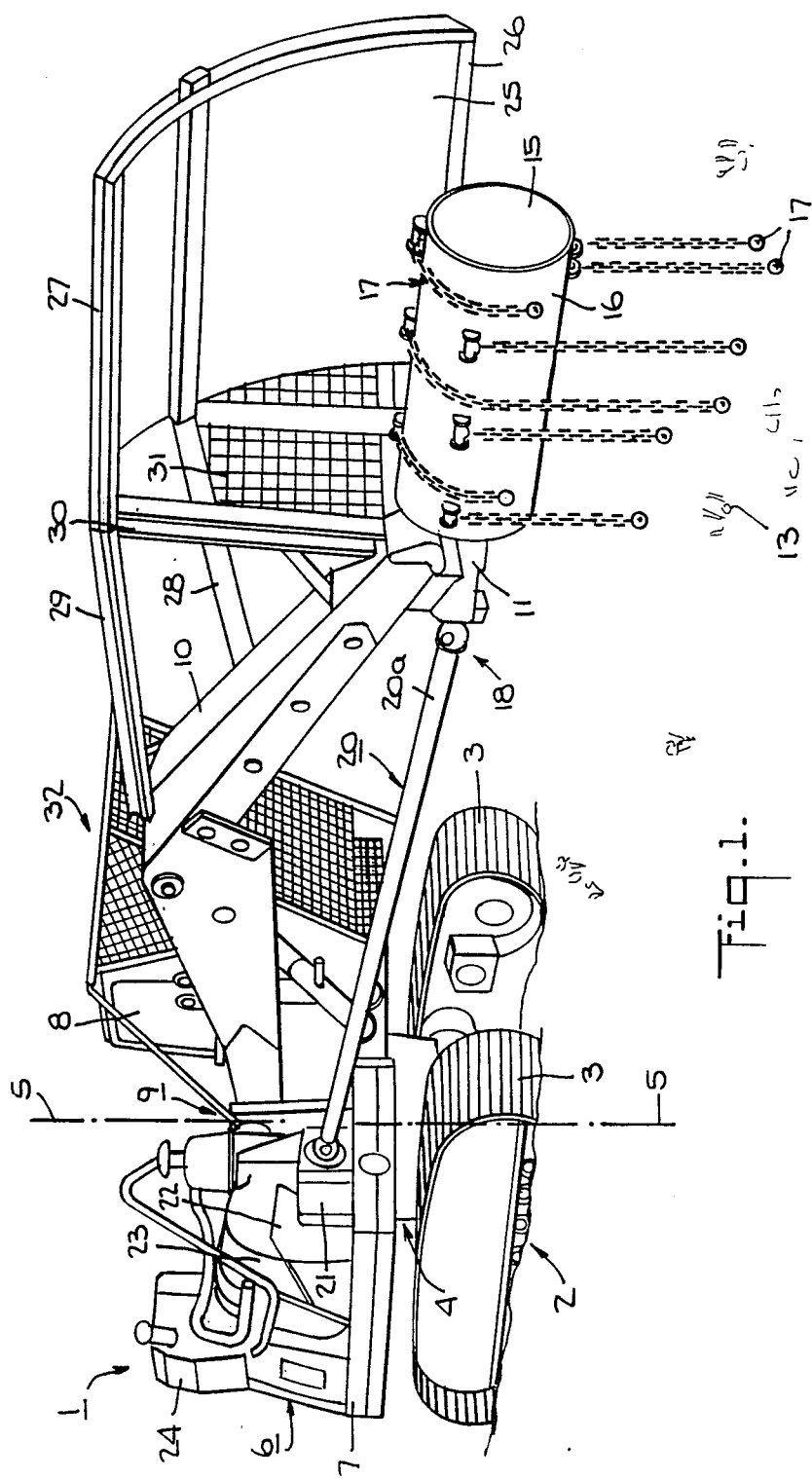
FIG. 1 is a perspective front view of the complete apparatus in the travelling position.

FIG. 1 shows a vehicle 1 with an endless track chassis 2 comprising two hydraulically driven tracks 3. The chassis 2 comprises a slewing ring 4 surrounding a vertical pivot axis 5 for a rotatable superstructure 6 comprising a platform 7.

Figure 6:
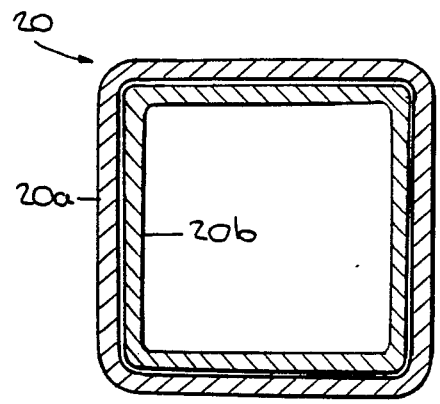
FIG. 6 is a cross-section through the cardan shaft.

Platform 7 carries an operator cabin 8 with the necessary controls and a horizontal hinge axis 9 to which a hydraulically adjustable boom 10 is secured, the plane of symmetry thereof being adapted to pivot in a vertical plane in which pivot axis 5 is also located. Boom 10 is in the form of a wide-open "V" with its apex directed upwardly. At its far end, boom 10 has a bearing 11, having an axis 12 which (FIG. 4) runs, when the apparatus is operational, horizontally and parallel with the ground 13 upon which the apparatus rests. A shaft 14, mounted at each end, passes through bearing 11, the end of the said shaft remote from pivot axis 5 being in the form of a drum 15. The said drum carries upon its outer surface 16 a total of twelve elements 17 which are described hereinafter in greater detail and which, in the position of rest illustrated, either hang down slack or lie upon surface 16 of the said drum. A cardan shaft 20, carrying a universal joint 18, 19 at each end, runs, through a speed-change gearbox 21 and a clutch 22, to a drive motor 23 which is secured, together with a fuel tank 24, to the platform 7. According to FIG. 6 the said cardan shaft consists of two tubes adapted to telescope into each other, to wit an outer tube 20a and an inner tube 20b. This makes it possible to bridge a considerable change in length as boom 10 moves up and down. Drum 15 is substantially concentric, the entire length thereof being surrounded by a protective device 25 which covers approximately one quadrant of the periphery of the drum, which is made of thick sheet metal bent into a curve, and which is located at a distance form the drum such that flexible elements 17, when tautened by centrifugal force, cannot reach it. Protective device 25 is suspended from frame struts 26, 27, 28, 29 and 30 and is closed off from operator cabin 8, within the said quadrant, by means of wire grid 31. The front surface of the said cabin is also protected against flying objects by a wire basket 32. As seen from the front, the position of protective device 25 assumes that drum 15 will rotate in a clockwise direction, in which case boom 10 pivots, during the cultivating process, towards the observer of FIG. 1. It may be desirable to reverse the direction of rotation of drum 15 and to arrange protective device 25 in the opposing upper quadrant. This provides the operator with a better view since the cultivating process is carried out while boom 10 is executing a pivoting movement away from the observer of FIG. 1.

It may also be gathered from FIG. 1 that, as a result of the chosen arrangement, shaft 14, and therefore the axis of drum 15 which is an extension thereof, run radially of vertical pivot axis 5, and that the said pivot axis lies outside the length of the said drum at a distance amounting to a multiple of the length thereof. Pivoting superstructure 6 therefore makes it possible to cultivate a correspondingly larger sector of a circle, while upward and downward movements of drum 15 cannot exert any appreciable unfavorable effect upon the parallelism between the said drum and ground 13.

Figure 2:
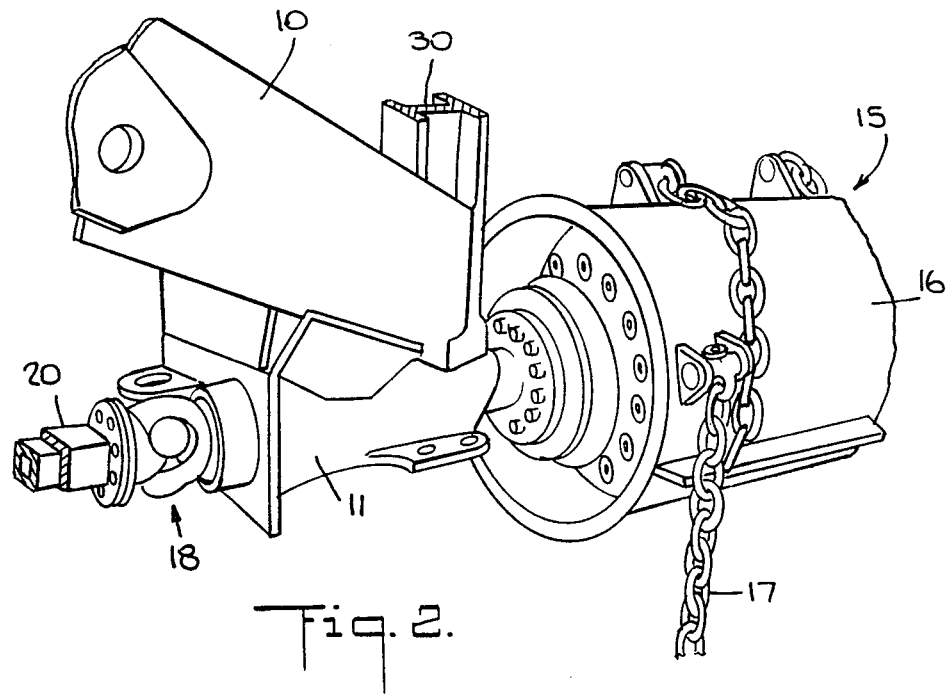
FIG. 2 illustrates the end of the boom with a bearing for the shaft in the form of a drum and partial view of this drum, as seen obliquely from the rear.

FIG. 2 shows quite clearly details of the attachment of bearing 11 to the free lower end of boom 10. It may be seen from FIG. 3 that 12 flexible elements 17 are arranged in a total of six radial planes, the said elements being hinged in pairs, each within a radial plane, to diametrically opposed locations upon drum 15. It may also be seen that the hinge locations in each radial plane are staggered through 90 degrees in relation to those in the immediately adjacent radial plane, so that the individual flexible elements, in the form of link chains, interfere with each other as little as possible, in spite of the fact that they overlap. It may also be seen that the flexible elements are secured to hinges 33 which move in the peripheral direction, the said hinges being explained in greater detail in conjunction with FIG. 5. It may also be gathered that drum 15 is stiffened by means of longitudinal ribs 34 applied to its surface and arranged centrally between hinges 33 which are staggered through 90 degrees around the periphery. This arrangement effectively prevents drum 15 from being deformed locally by possible blows from flexible elements 17.

Figure 3:
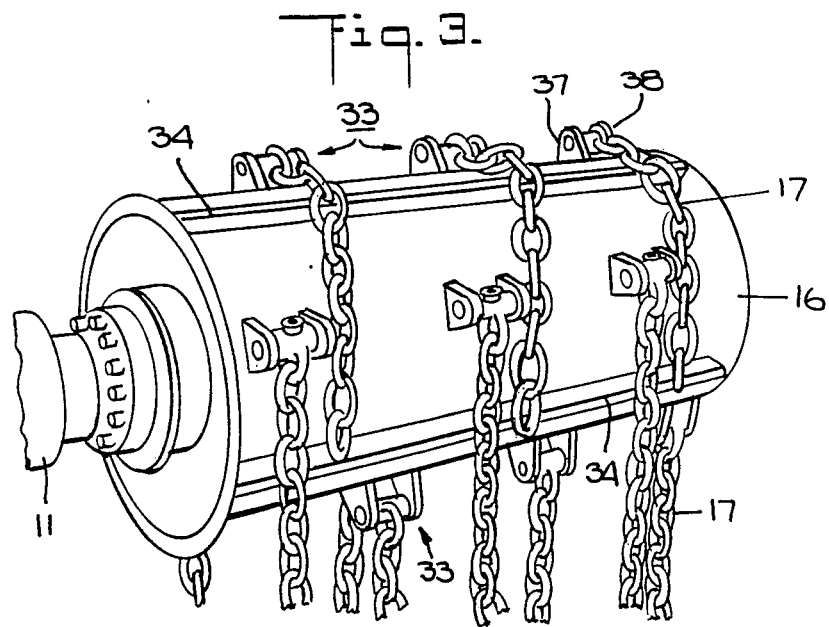
FIG. 3 is a view of the drum at rest.

In FIG. 5, one of hinges 33 in FIG. 3 is shown to an enlarged scale. Each of these hinges comprises a pin 35 running parallel with axis 15a of the drum (FIG. 4). Each end of pin 35 is mounted in a bore 36 of a bearing-bracket 37, 38 secured to surface 16 of the drum. The said pin is enclosed in a sleeve 39 carrying an attachment element 40 for one of the flexible elements 17. In the simplest case, attachment element 40 may consist of a cut chain link welded centrally and radially to sleeve 39. Hinges 33 are provided with grease fittings. Grease nipples, arranged in the interior of a protective collar 41, are fitted from time to time.

Figure 7:
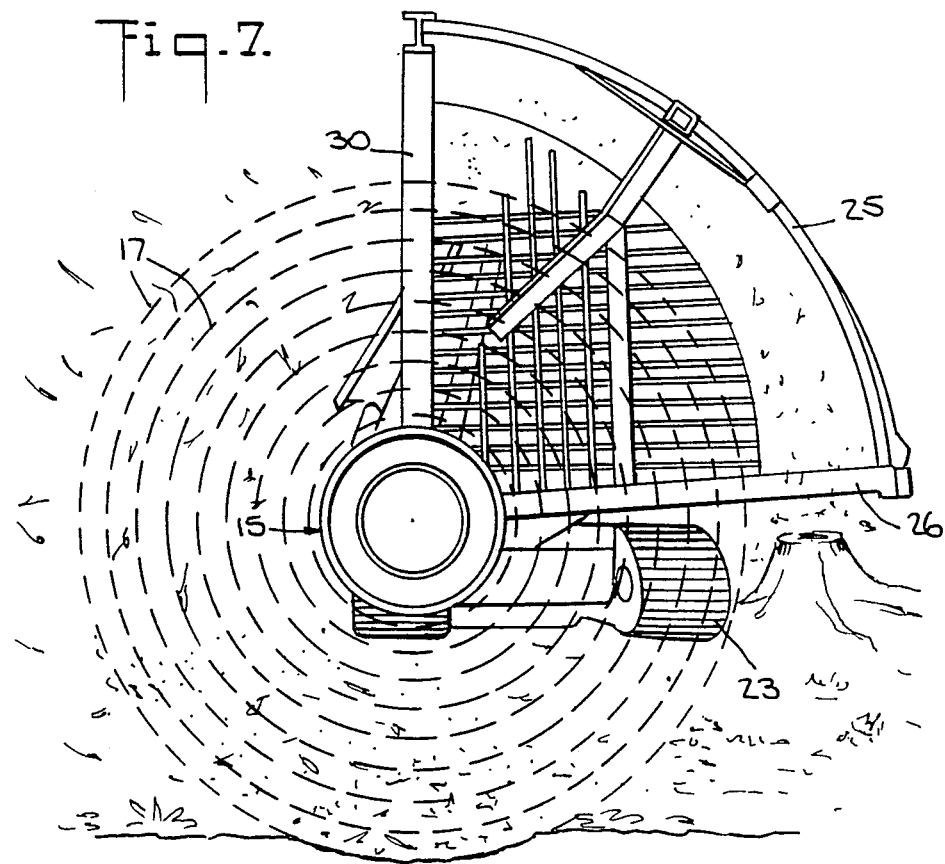
FIG. 7 is a plan view of the front face of the drum.

FIG. 4 shows how drum 15 is secured to the end of shaft 14. The transfer of torque is effected by means of a radial disc 42 bolted to the said shaft and connected inseparably to the said drum, for example by welding. FIG. 7 shows the circular paths followed by individual chain links as they rotate about their common axis. There are, of course, deviations from these paths as the chains penetrate into the soil, into the layer lying upon the soil, and into the mulch. The spatial position of protective device 25 in relation to drum 15 is shown approximately to scale. This device also serves as a guide for particles of mulch and soil and may, if necessary, be extended to the opposing upper quandrants.

The device consisting of shaft 14, drum 15 and flexible elements 17 may also be referred to as a "mulch head".

Although the invention has been described with particular reference to a preferred embodiment, it will be apparent to one skilled in the art that variations and modifications are possible within the spirit and scope of the invention which is defined solely by the claims.

If shaft 14 is connected to a hydraulic or an electric motor, the drive for the mulch head may also be through hydraulic lines or electrical cables. Furthermore the flexible elements may be steel cables, and additional centrifugal weights 17a may be fitted at least to the ends of the flexible elements, as illustrated in FIG. 1.

The embodiments of the invention in which an exclusive property or privilege is claimed are defined as follows:

1. An apparatus for cultivating plantable soils by breaking-up and working-in plant materials such as leaves, needles, twigs and branches, said apparatus comprising:
   a vehicle adapted for travel over the ground, said vehicle comprising a chassis and a superstructure, said superstructure being adapted to rotate about a vertical pivot-axis in relation to the chassis;
   a boom attached to said superstructure and adapted to extend radially from said vertical axis;
   a shaft connected to the distal end of said boom so that the longitudinal axis of said shaft is substantially radial to said pivot axis and said shaft is adapted for rotation about said longitudinal axis; and a plurality of elements that are flexible in all directions and attached to said shaft so that when said shaft rotates centrifugal force causes said flexible elements to extend substantially radially.

2. The apparatus according to claim 1 wherein said boom is articulated so that said shaft can be subjected to vertical motion for the purpose of adjusting the distance between the drum and the ground.

3. An apparatus according to claim 2 wherein said boom is articulated so that said shaft can be subjected to vertical motion for the purpose of adjusting the distance between the drum and the ground.

4. An apparatus according to claim 1, wherein said shaft carries a drum to the surface of which are hinged the flexible elements, in pairs, at diametrically opposite locations, and in one of several radial planes; and in that the attachment locations in each radial plane are displaced through an angle of 90 degrees in relation to those in the directly adjacent radial plane.

5. An apparatus according to claim 1, wherein twelve flexible elements are arranged in six radial planes.

6. An apparatus according to claim 1, wherein said the flexible elements are link chains.

7. An apparatus according to claim 1, wherein said the flexible elements are steel cables.

8. An apparatus according to claim 1, wherein said the shaft is extended by a cylindrical drum to the surface of which elements flexible in all directions, are secured by hinges adapted to move peripherally.

9. An apparatus according to claim 8, wherein the hinge pin of the hinges run parallel with the axis of rotation and the axis of the drum beteen bearing-brackets, and carry sleeves upon each of which is arranged an attachment-element to which a flexible element is fitted.

10. An apparatus according to claim 8, wherein said hinges are each provided with a grease-fitting.

11. An apparatus according to claim 4, wherein the periphery of the drum is stiffened with longitudinal ribs.

12. An apparatus according to claim 4, wherein the distance, in the peripheral direction of the drum, between the hinge-axes is between 0.5 and 1.5 times the length of the flexible elements.

13. An apparatus according to claim 4, wherein the length of the flexible elements is between 0.8 and 2.5 times the diameter of the drum.

14. An apparatus according to claim 4, wherein the vertical pivot-axis is located externally of the length of the drum.

15. An apparatus according to claim 1, wherein a drive-motor for the shaft is located upon the pivotable superstructure that is proximal to said vertical axis and said drive motor is connected to the said shaft by a flexible power-transmitting device.

16. An apparatus according to claim 15, wherein said flexible power-transmitting device is a cardan-shaft, the said cardan-shaft comprising two universal joints, between which the said shaft consists of having two telescoping tubes between them, said tubes having polygonal profiles.

17. An apparatus according to claim 1, wherein the weight of the flexible elements per running metre is between 5 and 15 kg.

18. An apparatus according to claim 1, wherein additional centrifugal weights are fitted at least to the ends of the flexible elements.

19. An apparatus according to claim 1, wherein the vehicle is an endless track vehicle.

20. An apparatus according to claim 1, wherein said shaft, carrying the flexible elements, is surrounded by at least one protective device which is adapted to open downwardly.

21. A method for cultivating plantable soils by breaking-up and working-in plant material such as leaves, needles, twigs and branches, comprising the steps of:

rotating a plurality of elements that are flexible in all directions and attached to a shaft so that the elements are tautened by centrifugal force when said shaft is rotated about its longitudinal axis and the radius of the rotation of the ends of said elements is greater than the distance between the axis of rotation of the shaft and the surface of the ground;

subjecting said shaft to an oscillating pivoting motion about a vertical axis such that said shaft is substantially radial to said vertical axis; and subjecting said shaft to a motion that is substantially radial to said vertical axis, whereby said shaft is extended out from said vertical axis.

22. The method of claim 21 further comprising the step of subjecting said shaft to vertical motion such that the shaft remains substantially parallel to the ground.

23. The method of claim 21 further comprising the step of displacing said pivot axis during a cultivating process.

24. The method of claim 21 wherein the shaft rotates between 500 and 1000 r.p.m.$^{-1}$.

* * * * *

UNITED STATES PATENT AND TRADEMARK OFFICE
CERTIFICATE OF CORRECTION

PATENT NO. : 4,862,969

DATED : September 5, 1989

INVENTOR(S) : Jobst et al

It is certified that error appears in the above-identified patent and that said Letters Patent is hereby corrected as shown below:

Column 7, line 28, "the flexible" should be --flexible--;

Column 7, line 30, "the flexible" should be --flexible--;

Column 7, line 32, "the shaft" should be --shaft--;

Column 7, line 37, "beteen" should be --between--;

Column 8, lines 11-12, ", between which the said shaft consists of" should be deleted.

Signed and Sealed this

Twenty-seventh Day of November, 1990

Attest:

HARRY F. MANBECK, JR.

*Attesting Officer*  *Commissioner of Patents and Trademarks*